United States Patent [19]

Sweet et al.

[11] Patent Number: 5,313,778
[45] Date of Patent: May 24, 1994

[54] AUTOMATIC TURBINE ENGINE BLEED VALVE CONTROL FOR ENHANCED FUEL MANAGEMENT

[75] Inventors: David H. Sweet, Tequesta, Fla.; Charles W. Evans, Norfolk, Conn.

[73] Assignee: United Technologies Corporation, Hartford, Conn.

[21] Appl. No.: 988,520

[22] Filed: Dec. 10, 1992

[51] Int. Cl.[5] .............................................. F02C 9/18
[52] U.S. Cl. ................................... 60/39.02; 60/39.29
[58] Field of Search .......................... 60/39.02, 39.29; 415/26, 27, 28

[56] References Cited

U.S. PATENT DOCUMENTS

| | | | |
|---|---|---|---|
| 4,502,275 | 3/1985 | Petro | 60/39.29 |
| 4,756,152 | 7/1988 | Krukoski et al. | 60/39.02 |
| 4,825,639 | 5/1989 | Krukoski | 60/39.29 |
| 4,991,389 | 2/1991 | Schafer | 60/39.29 |

Primary Examiner—Louis J. Casaregola
Attorney, Agent, or Firm—Michael Grillo

[57] ABSTRACT

A bleed air control system for an aircraft gas turbine engine operates in a fuel saving mode in response to operation of the aircraft in a steady-state cruise condition (215,350) within a threshold flight envelope (202,310) during steady-state engine operation above a threshold range. During operation in the fuel saving mode, a gas turbine engine compressor bleed valve (10) is closed. The rate of bleed valve closure is determined as a function of bleed valve position (12,20) and gas generator speed (26,30) at the instant the fuel savings mode is initiated. The bleed air control system is returned to normal operation in response to actual or commanded engine acceleration above respective threshold magnitudes, in response to aircraft load factor differing from a reference load factor by a threshold magnitude, and in response to the discontinued operation of the aircraft at steady-state cruise conditions, discontinued steady-state operation of the engine above the transient range, or operation of the aircraft outside of the threshold flight envelope.

18 Claims, 4 Drawing Sheets

AUTOMATIC TURBINE ENGINE BLEED VALVE CONTROL FOR ENHANCED FUEL MANAGEMENT

DESCRIPTION

1. Technical Field

The present invention relates to gas turbine engines and more particularly to control of a gas turbine engine compressor bleed valve during engine operation for enhanced fuel management.

2. Background of the Invention

As is well known in the art, it is necessary to operate gas turbine engines close to the engine's surge line in order to transition from one steady-state mode of operation to another as quickly as possible. Excursion beyond the surge line cannot be tolerated because a resulting surge can result in sudden thrust loss and/or engine over-temperature. Typically, engine controls monitor various engine parameters and include schedules of engine parameters which are used to automatically control the engine, accounting for the surge characteristics of the particular engine (with an adequate safety factor) for which the control is designed.

Gas turbine engines with anti-stall systems typically include a compressor bleed valve which bleeds air from the compressor discharge to unload the compressor in accordance with the pressure level therein during starting and low power operation. The bleed valve extends the operating range of the engine by allowing the engine to be operated as close to the stall region of the compressor as possible. During steady-state engine operation, it is known to modulate the compressor bleed valve in accordance with a particular schedule based on such parameters as altitude, air speed and engine power level. Typically, during transient engine operation the steady-state bleed valve position is reset more open by an amount which is a function of the ratio of actual rate of speed change of the compressor to a maximum scheduled rate of speed change of the compressor, biased to account for engine speed (i.e., power level). The closer the actual rate of change is to the scheduled maximum rate of change, the more the bleed valve is opened. Such a system is shown and described in commonly owned U.S. Pat. No. 4,756,152 by Leon Krukoski and Nicola Laudadio.

The closer the compressor operating line is to the stall line, the better the engine performance. Ideally, it is desired to maintain the compressor pressure ratio at an approximately constant safe distance below the stall line over the entire operating range of the engine. Such a system is shown and described in commonly owned U.S. Pat. No. 4,991,389 by Bradly C. Schafer wherein a consistently small, but allowable compressor surge margin is maintained during transient engine operation. A control system modulates the compressor bleed valve between full open and full closed positions as a function of the rate of change of compressor speed biased by flight conditions and corrected for engine power level.

One drawback in the traditional method of bleed valve control is that the bleeding of compressor air overboard causes the engine to run hotter, faster, and burn more fuel than may be necessary for certain flight conditions. This has been acceptable since eliminating or closing the bleed valve early can lead to sudden engine compressor stall, a hung power condition, engine flameout, or compressor damage during changes in engine power demand. Unfortunately, many operators often cruise long distances at a consistent part power condition and therefore burn far more fuel than is needed because the bleed valve always remains open to provide a surge margin in anticipation of any sudden commanded engine transient, e.g., acceleration.

An additional problem associated with bleed valves is that traditional mechanical/pneumatic bleed valves are subject to frequent failure. Proper operation of the bleed valve may be compromised due to failure or blockage in a pressure line, dirt and debris within a bellows, failure of a bellows, and other related contamination of the valve assembly. Additionally, if the valve fails in flight, there may be no warning to the pilot. Therefore, if the bleed valve is stuck in a full open position, maximum available power is limited. Similarly, if the bleed valve is stuck closed, then the engine may surge, hang or flameout during engine transients. Erratic bleed valve scheduling also leads to poor engine/power management, reduced aircraft handling qualities, and asymmetric load sharing in multi-engine aircraft.

DISCLOSURE OF THE INVENTION

Objects of the invention include the provision of an improved bleed air control system for a gas turbine engine, the bleed air control system having a fuel savings mode to improve gas turbine engine fuel economy under certain engine and flight conditions.

A further object of the present invention is to provide a gas turbine engine bleed air control system having improved fuel economy under certain flight conditions while remaining responsive to changes in engine and aircraft conditions thereby maintaining a safe surge margin at all times.

According to the present invention, a fuel savings mode of an aircraft gas turbine engine bleed air control system is activated in response to the operation of the aircraft in a steady-state cruise condition within a threshold flight envelope during steady-state engine operation above a threshold range.

In further accord with the present invention, a compressor bleed valve is closed in response to the activation of the fuel savings mode, the rate of bleed valve closure being determined as a function of the initial bleed valve position and gas turbine engine speed.

In still further accord with the present invention, the fuel savings mode is deactivated, and normal bleed valve control is resumed in response to actual or commanded engine acceleration above respective threshold magnitudes, in response to aircraft load factor differing from a reference load factor by a threshold magnitude, and in response to the discontinued operation of the aircraft at steady-state cruise conditions, discontinued steady-state operation of the engine above the transient range, or operation of the aircraft outside of the threshold flight envelope.

The gas turbine engine bleed air control system of the present invention automatically and deliberately closes the compressor bleed valve during steady-state aircraft and engine operation in order to improve engine specific fuel consumption. Thereafter, aircraft and engine conditions are monitored, and the bleed valve is automatically opened upon a departure from the steady-state conditions. Additionally, the bleed valve is automatically opened in response to actual or commanded engine acceleration or deceleration exceeding the threshold, thereby automatically restoring the engine's surge protection margin at the time when it is needed. The system announces to the flight crew the status of the bleed valve at all times. Therefore, the crew will know if the bleed valve is using normal control, or if it is closed in the fuel savings mode. Additionally, the valve is designed to fail safe, i.e., in an open position, and the crew is notified of any bleed valve failure condition.

Another advantage of the invention is that in flight engine power assurance testing may be performed to verify engine operation at manufacturer's specifications. Maximum engine power is available when the bleed valve is in the closed position, and therefore, power assurance tests require engine operation with the bleed valve closed. The bleed valve control system of the present invention therefore allows the performance of such in flight power assurance tests.

The system of the present invention may utilize digital engine control laws which reside in a digital engine control system. The invention may also be implemented in a dedicated microprocessor separate from the engine control. A digitally commanded servo-valve motor modulating a standard pressure relief valve is utilized as the bleed valve. Therefore, accurate control of bleed valve position is achieved. Bleed valve position feedback to the bleed valve control is provided for closed loop command following and fault detection.

Other objects, features and advantages of the present invention will become more apparent in light of the following detailed description of exemplary embodiments thereof, as illustrated in the accompanying drawings.

BEST MODE FOR CARRYING OUT THE INVENTION

The bleed air control system of the present invention is particularly well suited for improving aircraft gas turbine engine fuel economy while maintaining a safe surge margin at all times. Aircraft and engine operating conditions are monitored, and under certain steady-state engine and flight conditions, the bleed air control system operates in a fuel savings mode wherein a compressor bleed valve is closed. If the steady-state engine and flight conditions are not maintained, or if actual or commanded engine acceleration exceed respective threshold magnitudes, the bleed air control system returns to a normal operating mode wherein the engine surge margin is maintained by modulating the compressor bleed valve between the full open and full closed positions.

Figure 1:
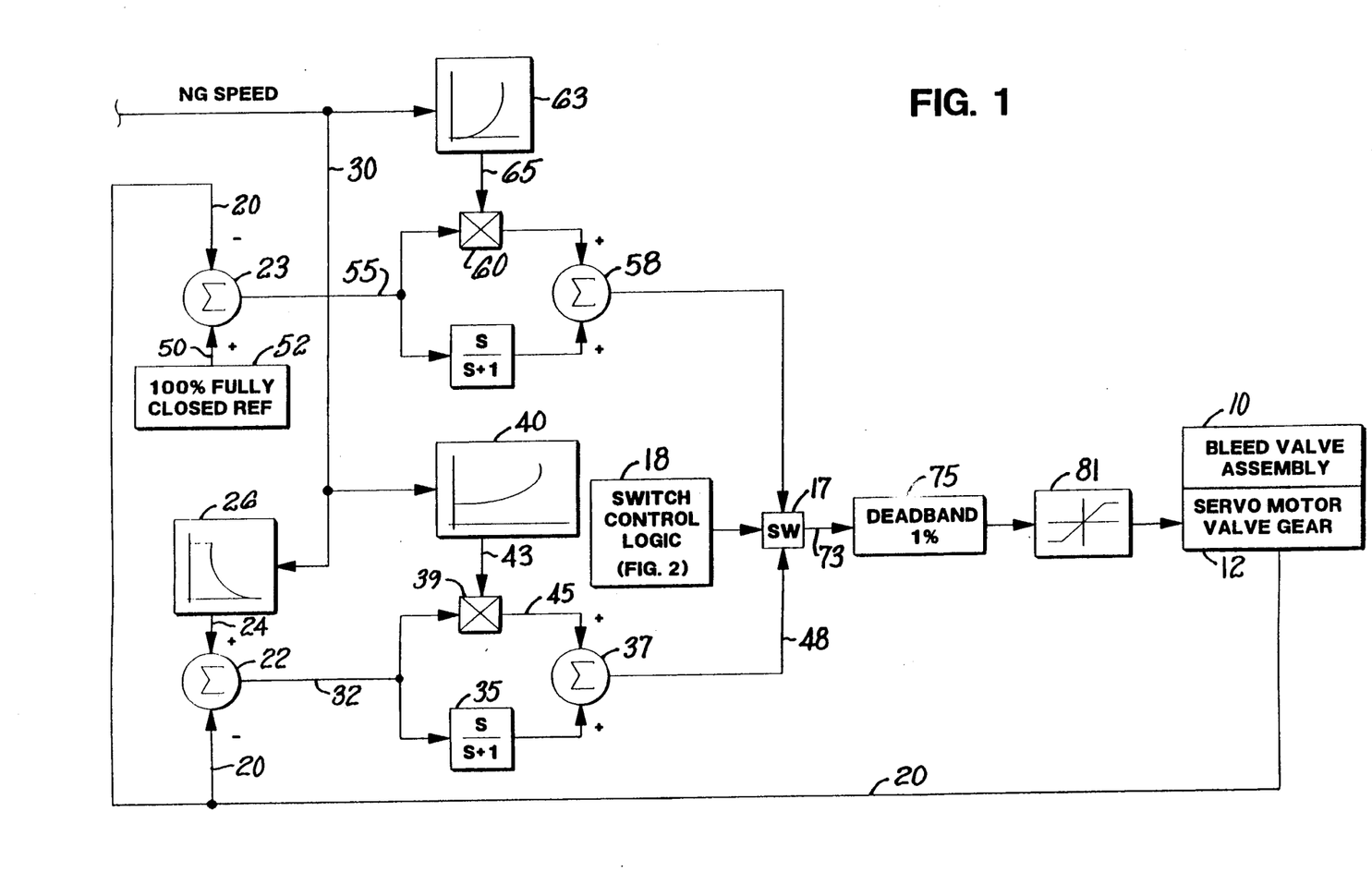
FIG. 1 is a schematic block diagram of a gas turbine engine bleed air control system of the present invention.

The invention is described herein as being used with a bleed valve of the type having a digitally commanded servo-valve motor which modulates a standard pressure relief valve. Referring to FIG. 1, the position of a compressor bleed valve 10 is controlled by a valve gear which is driven by a servo motor 12. The servo motor receives digital bleed valve control signals from a bleed air control system 15. The bleed air control system is operated in one of two modes; a normal mode and a fuel savings mode (FSM). During operation in the normal mode, the bleed air control system modulates the position of the bleed valve between a full closed position and a full opened position, and ideally maintains the compressor pressure ratio at an approximately constant safe distance below a stall line over the entire operating range of the engine. The fuel savings mode is only available when the aircraft is under steady-state engine and flight conditions. During operation in the fuel savings mode, the bleed valve is in the full closed position. The bleed air control system 15 is switched between the normal mode and the fuel savings mode by a mode control switch 17 which is controlled by switch control logic 18. The switch control logic will be described in greater detail hereinafter with respect to FIGS. 2 and 3.

The servo motor 12 provides a bleed valve position signal on a line 20 which is indicative of the position of the bleed valve. The bleed valve position signal is provided on the line 20 to a summing junction 22 in a normal mode path of the bleed air control system, and to a summing junction 23 in a fuel savings mode path of the bleed air control system. The other input to the summing junction 22 in the normal mode path is a normal mode position signal on a line 24 provided by a normal mode control law function 26. The normal mode control laws are responsive to a signal on a line 30 indicative of gas generator speed (NG).

The normal mode control laws schedule bleed valve position based on the gas generator speed, and attempt to maintain the proper compressor ratio at an approximately constant safe distance below the stall line over the entire operating range of the engine. Although the normal mode control laws are shown only responsive to gas generator speed, more complex controls may be utilized to determine the proper normal mode position of the bleed valve in accordance with the present invention. For purposes of the present invention, the normal mode control laws simply control the position of the compressor bleed valve between a fully open a fully closed position to maintain the compressor surge margin. Any suitable method of scheduling the position of the bleed valve during operation in the normal mode may be used without departing from the spirit and scope of the present invention.

The output of the summing junction 22 is a normal mode error signal on a line 32 indicative of the amount of change in bleed valve position for the bleed valve to be at the bleed valve position scheduled by the normal mode control laws 26. The normal mode error signal is provided via an integral path and a proportional path to a summing junction 37. The proportional path contains a multiplication function 39 wherein the error signal is multiplied by a gain signal provided by a normal mode gain function 40. The normal mode gain function 40 is also responsive to the NG signal on the line 30 for providing the gain signal on a line 43 to the multiplication function 39. The output of the multiplication function is provided on a line 45 to the summing junction 37. The integral path contains an integrator 35 for integrating the normal mode error signal. The output of the integrator is provided to the summing junction 37. As is known in the art, by providing both a proportional path and an integral path for the error signal, the resulting normal mode command signal provides a smooth and rapid response for adjusting the position of the bleed valve assembly to the position commanded by the normal mode control laws. The output of the summing junction 37 is the normal mode command signal on a line 48, and is provided to the switch 17.

The other input to the summing junction 23 in the fuel savings mode path is a reference signal on a line 50. The reference signal is provided by a reference function 52, and is indicative of the bleed valve in the 100% fully closed position. During operation in the fuel savings mode, the bleed valve is in the fully closed position and therefore, the output of the summing junction 23 is a fuel savings mode error signal on a line 55 indicative of the change in the bleed valve position from its current position to the 100% fully closed position. The fuel savings mode error signal is provided via a proportional path and an integral path to a summing junction 58. The proportional path contains a multiplication function 60 where the fuel savings mode error signal is multiplied by a fuel savings mode gain signal provided by a gain function 63 on a line 65. The fuel savings mode gain function is responsive to NG on the line 30 for providing the gain signal on the line 65. The integral path contains an integrator 66 for integrating the fuel saving mode error signal. The output of the integrator is provided to the summing junction 58. The output of the summing junction 58 is a fuel savings mode command signal on a line 70, and is provided to the switch 17.

During operation in the normal mode, the switch 17 provides the normal mode command signal as the bleed valve control signal on a line 73. During operation in the fuel savings mode, the switch 17 provides the fuel savings mode command signal as the bleed valve control signal on the line 73. The bleed valve control signal is then applied to a deadband function 75. The bleed valve control signal is a command signal for changing the position of the bleed valve. If the magnitude of the bleed valve control signal commands a change from the current bleed valve position of less than 1%, the output of the deadband function is 0 on a line 79. If the magnitude of the bleed valve control signal is greater than a 1% change in bleed valve position, then the output of the deadband function is equal to the input. The purpose of the deadband function is to prevent hunting of the bleed valve in response to small bleed valve control signals or noise, and also to prevent high cycle and/or high frequency fatigue of the bleed valve.

The bleed valve control signal is then applied to a limiter function 81 which limits the magnitude of the bleed valve control signal. The output of the limiter function is provided on a line 85 to the servo motor 12.

Figure 2:
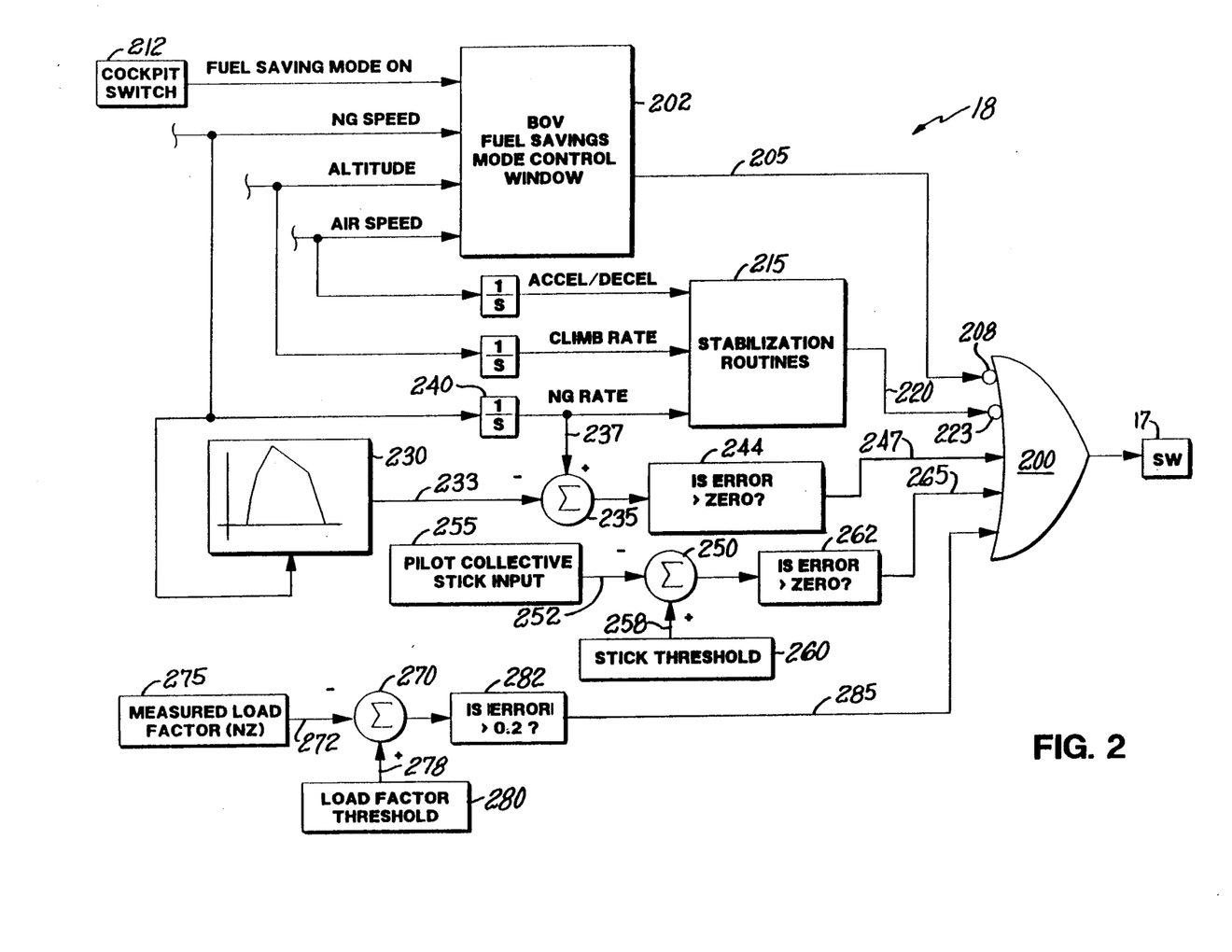
FIG. 2 is a schematic block diagram of a switch control logic portion of the system of FIG. 1.
Figure 3:
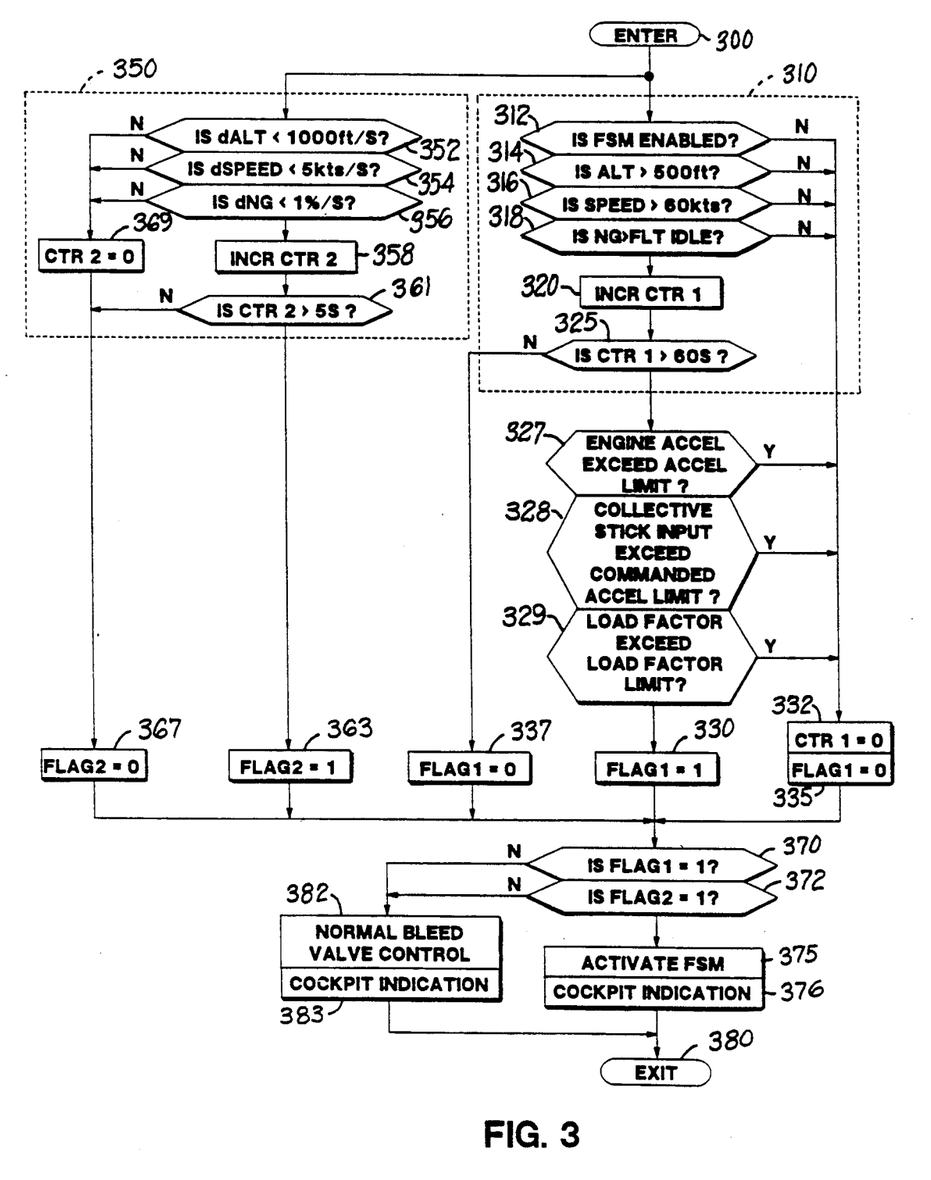
FIG. 3 is a logic flow diagram of switch control routines for providing the switch control of FIG. 2.

The bleed valve mode control switch 17 is controlled by switch control logic 18 which is described in greater detail with respect to FIGS. 2 and 3. Referring to FIG. 2, an OR gate 200 is shown as providing the mode control signal to the mode control switch. For purposes of describing the present invention, when the output of the OR gate 200 is high (or one), the switch 17 provides the normal mode command signal as the bleed valve control signal. Similarly, when the output of the OR gate 200 is low (or zero), the switch 17 provides the fuel savings mode command signal as the bleed valve control signal.

When the engine is initially powered up, the output of a fuel saving mode enable logic 202 will be low on a line 205. The signal on the line 205 is provided to the OR gate via a NOT (invertor) 208, and therefore the output of the OR gate is high (one), and the bleed valve is controlled in the normal mode. The fuel saving mode enable logic 202 provides an enable signal (high or one) on the line 205 when the following conditions are simultaneously met for at least sixty seconds:

1. The fuel savings mode is enabled, e.g., a cockpit bleed air control switch 212 is in a fuel savings mode position.
2. The aircraft is above a threshold altitude, e.g., the radar altimeter and/or barometric height indicated above ground is greater than 500 feet.
3. The gas generator speed is greater than flight-idle speed.
4. Aircraft flight speed is greater than an aircraft threshold flight speed, e.g., 60 knots.

In addition to the above requirements, the aircraft must not be in a transient state during operation in the fuel savings mode. Therefore, certain flight conditions are checked by stabilization routine logic 215 to determine if the aircraft is in a steady-state operating condition. When the steady-state conditions are met, the stabilization routine logic 215 provides an output signal (high or one) on a line 220 to the OR gate via a NOT (invertor) 223. The following steady-state conditions must be met for at least five seconds to enable the fuel savings mode:

1. Aircraft acceleration and deceleration must be less than a threshold magnitude, e.g., ±5 knots per second.
2. The rate of change in aircraft altitude must be less than a threshold magnitude, e.g., ±1000 feet per minute.
3. The rate of change of gas generator speed must be less than a threshold magnitude, e.g., less than ±1% per second.

If the above steady-state conditions are established, and the fuel savings mode is enabled, then the mode control switch 17 provides the fuel savings mode control signal as the bleed valve control signal on the line 73 (FIG. 1).

If the fuel savings mode is engaged, return to the normal bleed valve control will only occur if one of the following events occur:

1. The pilot disables the fuel savings mode, e.g., the bleed air control switch is placed in a normal mode position.
2. The aircraft exceeds the fuel savings mode flight envelope, e.g., altitude is less than 500 feet, air speed is less than 60 knots, or NG is less than flight idle.
3. Engine acceleration exceeds an acceleration limit.
4. Pilot collective stick input exceeds a stick threshold limit.
5. The difference between aircraft Load Factor (NZ), i.e, aircraft vertical acceleration, and a reference Load Factor, e.g., 1 g, exceeds a threshold limit.

If any of the above conditions occur, the fuel savings mode is disabled, and thereafter the enable conditions must be simultaneously met for sixty seconds to re-enable the fuel savings mode.

An engine acceleration schedule 230 is responsive 233 to the NG signal for providing a limit signal on a line to a summing junction 235. The other input to the summing junction is a gas generator acceleration signal (NG RATE) on a line 237. The NG RATE signal is provided by applying the NG signal to a differentiating function 240. If the output of the summing junction 235 is greater than zero, engine acceleration exceeds the acceleration threshold, and an error function 244 provides a signal (high or one) on a line 247 to the OR gate 200. Similarly, a summing junction 250 is responsive to a commanded acceleration signal on a line 252 indicative of the acceleration commanded by the pilot collective stick 255.

The summing junction 250 is also responsive to a limit signal on a line 258 indicative of a commanded acceleration limit, provided by a reference function 260. If output of the summing junction 250 is greater than zero, commanded acceleration exceeds the commanded acceleration limit, and an error function 262 provides a signal (high or one) on a line 265 to the OR gate 200.

A summing junction 270 is responsive to a load factor signal on a line 272 indicative of the aircraft vertical acceleration, as measured for example by a vertical accelerometer 275. The summing junction 270 is also responsive to a reference signal on a line 278 indicative of a load factor reference, provided by a reference function 280. If the magnitude (absolute value) of the summing junction output is greater than a threshold value, e.g., 0.2 g's, an error function 282 provides a signal (high or one) on a line 285 to the OR gate 200.

The fuel savings mode is temporarily disabled if any transient conditions occur while the fuel savings mode is enabled. Therefore, if the rate of change in aircraft altitude or engine speed exceed their respective thresholds, or if the vertical acceleration or deceleration exceeds the acceleration or deceleration threshold, then the fuel savings mode is disabled. Thereafter, the fuel savings mode is re-enabled if the steady-state conditions are met for at least five seconds.

The bleed valve mode control routines of the present invention are described in FIG. 3. Referring to FIG. 3, the routine is entered in a step 300. Two subroutines 310 and 350 are then simultaneously processed. The subroutine 310 is the fuel savings mode enable logic and subroutine 350 is the fuel savings mode stabilization routines. In the subroutine 310, tests 312 through 318 are consecutively performed. In the test 312, it is determined whether the bleed valve control switch is in the fuel savings mode position. In the tests 314, 316 and 318 it is determined whether the aircraft is in the fuel savings mode flight envelope, e.g., is altitude greater than 500 feet, is speed greater than 60 knots, and is gas generator speed greater than flight-idle speed.

If all the conditions checked in the tests 312, 314, 316 and 318 are met, a first counter (timer) is incremented in a step 320. Next, a test 325 is performed wherein it is determined whether the first counter has timed out to sixty seconds. If the results of the test 325 are positive, tests 327, 328 and 329 are consecutively performed wherein it is determined if engine acceleration exceeds the acceleration limit, if the collective stick input exceeds the commanded acceleration limit, and if the difference between aircraft load factor and the reference load factor exceeds a threshold value. If the results of the tests 327, 328 and 329 are negative, the fuel savings mode is enabled, and a first flag (FLAG1) is set equal to one in a step 330. If the results of any one of the tests 327, 328 or 329 are positive, the fuel savings mode is disabled, and steps 332 and 335 are consecutively performed wherein the first counter is set equal to zero and the first flag is set equal to zero. Similarly, if any of the tests 312 through 318 are negative, the fuel savings mode is disabled, and the steps 332 and 335 are performed. If the results of the tests 325 are negative, a test 337 is performed wherein the first flag is set equal to zero. Therefore, if the aircraft has not been in the fuel savings mode flight envelope for at least sixty seconds, the fuel savings mode is not enabled.

In the subroutine 350, the tests 352 through 356 are consecutively performed to determine if the aircraft meets the steady-state conditions for activation of the fuel savings mode. In the test 352, it is determined if the rate of change in altitude is less than 1000 feet per minute. In the test 354, it is determined if the aircraft acceleration or deceleration is less than five knots per second. Finally, in the test 356 it determined if the change in gas generator speed is less than 1% per second.

If all three conditions checked in the tests 352, 354 and 356 are satisfied, a second counter (timer) is incremented in a step 358. Next, a test 361 is performed wherein it is determined whether the second counter has timed out to five seconds. If the results of the test 361 are positive, the steady-state conditions are met for fuel savings mode and a step 363 is performed wherein a second flag (FLAG2) is set equal to one. However, if the results of the tests 361 are negative, a step 367 is performed wherein the second flag is set equal to zero. If the results of any of the tests 352, 354 or 356 are negative, a step 369 is performed wherein counter 2 is set equal to zero. Thereafter, the step 367 is performed wherein the second flag is set equal to zero.

All of the steps 330, 335, 337, 363, and 367 reach tests 370 and 372 wherein it is determined if the first and second flags are both equal to one. If both flags are equal to one, steps 375 and 376 are consecutively performed wherein the fuel savings mode is activated, and a cockpit indication is provided indicative of the bleed valve being closed in the fuel savings mode. The subroutine then exits in a step 380. However, if either flag is equal to zero, steps 382 and 383 are consecutively performed wherein normal bleed valve control is initiated, and a cockpit indication is provided indicative of the bleed valve being operated in the normal mode. The subroutine then exits in the step 380.

Figure 4:
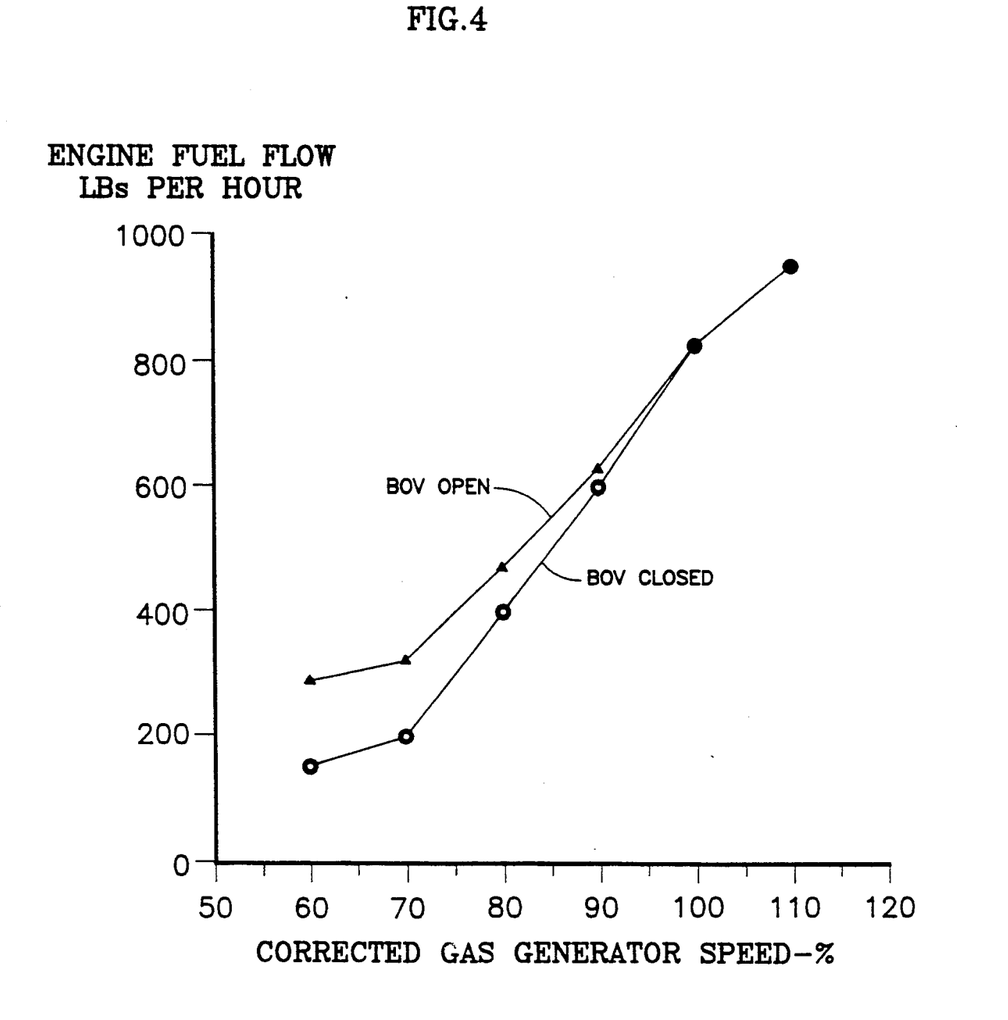
FIG. 4 is a graph comparing gas turbine engine fuel consumption during operation with and without the bleed air control system of FIG. 1.

FIG. 4 is a graph comparing gas turbine engine fuel consumption during operation in the normal mode and in the fuel savings mode. The vertical axis is the fuel consumption measure in pounds of fuel per hour, and the horizontal axis is the gas generator speed (corrected for temperature). As can be seen, during prolonged engine operation at part power conditions, a significant fuel savings can be realized using the fuel savings mode of the present invention. For example, at a gas generator speed of 70%, a fuel savings in excess of 100 pounds per hour can be obtained using the fuel savings mode of the invention.

The invention is described herein as being used with a bleed valve of the type having a digitally commanded servo-valve motor which modulates a standard pressure relief valve; however, the invention may be used with other types of valves having electric, pneumatic and hydraulic operators. In the case of valves having hydraulic or pneumatic operators, such operators must ultimately be operable by a bleed valve control signal for controlling the position of the bleed valve, and provide position feedback information indicative of the bleed valve position.

Although the bleed valve control system of the present invention is described herein as requiring a cockpit bleed air control switch 212 to be in a fuel saving mode position to enable the fuel saving mode, this switch is optional. The invention will work equally as well if the control system mode control is automatic, and the fuel saving mode is enabled provided that all required conditions are met. Additionally, the invention is described herein in the context of fuel savings because for a given aircraft speed, less fuel consumption is necessary during operation in the fuel savings mode. However, if fuels savings is not an objective, the invention provides the advantage of increased aircraft air speed for a given rate of fuel consumption during operation in the fuel savings mode.

The bleed valve control system of the present invention may be implemented in a variety of ways. As described hereinbefore, the system of the present invention may utilize digital engine control laws which reside in a digital engine control system. Alternatively, the invention may be implemented in a dedicated microprocessor separate from the engine control. Whenever a microprocessor or the like is used for implementing the invention, such as in a digital engine control, the invention may be implemented in software therein. As will be understood by those skilled in the art, the invention may be practiced utilizing dedicated digital components to implement the routines of the present invention in accordance with the general equivalence between dedicated digital hardware and software, which equivalence is described (in a different example) in U.S. Pat. No. 4,294,162.

It will be understood by those skilled in the art that the above described limits and threshold are experimentally derived for particular engine types. The numbers employed herein are applicable to the Pratt & Whitney, Canada, PT6B-36 engines as used in the Sikorsky S-76B helicopter. All of the cycle times, counts, and the like herein may of course be adjusted to suit any implementation and utilization of the invention.

Although the invention has been illustrated and described with respect to exemplary embodiments thereof, it should be understood by those skilled in the art that the foregoing and various other changes, omissions and additions may be made therein and thereto, without departing from the spirit and scope of the present invention.

We claim:

1. A gas turbine engine bleed air control system for controlling a turbine engine compressor bleed valve in response to engine operating parameters, comprising:
    a normal bleed schedule;
    a fuel savings mode schedule;
    means responsive to the steady-state operation of said gas turbine engine above a threshold gas generator speed for providing an enable signal; and
    said bleed air control system replacing said normal bleed schedule with said fuel savings mode schedule in response to said enable signal.

2. A gas turbine engine bleed air control system according to claim 1 further comprising:
    means responsive to the transient operation of said gas turbine engine for removing said enable signal; and
    said bleed air control system returning to said normal bleed schedule in response to the absence of said enable signal.

3. A gas turbine engine bleed air control system according to claim 1 wherein said compressor bleed valve is closed during operation of said bleed air control system on said fuel savings mode schedule.

4. A gas turbine engine bleed air control system according to claim 3 wherein the rate of compressor bleed valve closure during operation of said bleed air control system on said fuel savings mode schedule is determined as a function of compressor bleed valve position and gas generator speed at the instant said enable signal is provided.

5. A gas turbine engine bleed air control system for controlling the compressor bleed valve position of an aircraft gas turbine engine having a compressor from which a portion of the air can be bled off, comprising:
    a normal bleed schedule;
    a fuel savings mode schedule;
    means for providing a gas generator speed signal indicative of gas generator speed;
    means for providing an altitude signal indicative of aircraft altitude;
    means for providing an air speed signal indicative of aircraft air speed;
    means responsive to the magnitude of said gas generator speed signal, said altitude signal and said air speed signal being greater than respective threshold magnitudes and the rate of change thereof being below respective threshold magnitudes for providing an enable signal; and
    said bleed air control system replacing said normal bleed schedule with said fuel savings mode schedule in response to said enable signal.

6. A gas turbine engine bleed air control system according to claim 5 further comprising:
    means responsive the magnitude of said gas generator speed signal, said altitude signal or said air speed signal being less than respective threshold magnitudes or the rate of change thereof being greater than respective threshold magnitudes for removing said enable signal; and
    said bleed air control system returning to said normal bleed schedule in response to the absence of said enable signal.

7. A gas turbine engine bleed air control system according to claim 5 further comprising:
    an engine acceleration schedule responsive to said gas generator speed signal for providing a scheduled engine acceleration signal;
    means for providing a collective input signal indicative of pilot commanded collective input;
    means for providing a load factor signal indicative of aircraft load factor;
    means responsive to said scheduled engine acceleration signal differing from actual engine acceleration by a first threshold magnitude, said collective input signal differing from a reference collective input by a second threshold magnitude, or said load factor signal differing from a reference load factor by a third threshold magnitude for removing said enable signal; and
    said bleed air control system returning to said normal bleed schedule in response to the absence of said enable signal.

8. A gas turbine engine bleed air control system according to claim 5 wherein said compressor bleed valve is closed during operation of said bleed air control system on said fuel savings mode schedule.

9. A gas turbine engine bleed air control system according to claim 8 further comprising:
    means for providing a bleed valve position signal indicative of the position of said compressor bleed valve; and
    the rate of compressor bleed valve closure during operation of said bleed air control system on said fuel savings mode schedule being determined as a function of said compressor bleed valve position signal and said gas generator speed signal at the instant said enable signal is provided.

10. A method of controlling the position of a gas turbine engine compressor bleed valve in accordance with position schedules responsive to engine operating parameters, comprising the steps of:
  providing a normal bleed schedule;
  providing a fuel savings mode schedule;
  providing an enable signal, in response to the steady-state operation of said gas turbine engine above a threshold gas generator speed; and
  replacing said normal bleed schedule with said fuel savings mode schedule in response to said enable signal.

11. The method according to claim 10 further comprising the steps of:
  removing said enable signal in response to the transient operation of said gas turbine engine; and
  returning to said normal bleed schedule in response to the absence of said enable signal.

12. The method according to claim 10 wherein said compressor bleed valve is closed during operation on said fuel savings mode schedule.

13. The method according to claim 12 further comprising the step of determining the rate compressor bleed valve closure as a function of compressor bleed valve position and gas generator speed at the instant said enable signal is provided.

14. A method for controlling the compressor bleed valve position of an aircraft gas turbine engine having a compressor from which a portion of the air can be bled off, the method comprising the steps of:
  providing a normal bleed schedule;
  providing a fuel savings mode schedule;
  providing a gas generator speed signal indicative of gas generator speed;
  providing an altitude signal indicative of aircraft altitude;
  providing an air speed signal indicative of aircraft air speed;
  providing an enable signal in response to the magnitude of said gas generator speed signal, said altitude signal and said air speed signal being greater than respective threshold magnitudes and the rate of change thereof being below respective threshold magnitudes; and
  replacing said normal bleed schedule with said fuel savings mode schedule in response to said enable signal.

15. The method according to claim 14 further comprising the steps of:
  removing said enable signal in response to the magnitude of said gas generator speed signal, said altitude signal or said air speed signal being less than respective threshold magnitudes or the rate of change thereof being greater than respective threshold magnitudes; and
  returning to said normal bleed schedule in response to the absence of said enable signal.

16. The method according to claim 14 further comprising the steps of:
  providing an engine acceleration schedule responsive to said gas generator speed signal for providing a scheduled engine acceleration signal;
  providing a collective input signal indicative of pilot commanded collective input;
  providing a load factor signal indicative of aircraft load factor;
  removing said enable signal in response to said scheduled engine acceleration signal differing from actual engine acceleration by a first threshold magnitude, said collective input signal differing from a reference collective input by a second threshold magnitude, or said load factor signal differing from a reference load factor by a third threshold magnitude; and
  returning to said normal bleed schedule in response to the absence of said enable signal.

17. The method according to claim 14 wherein said compressor bleed valve is closed during operation on said fuel savings mode schedule.

18. The method according to claim 17 further comprising the steps of:
  providing a bleed valve position signal indicative of the position of said compressor bleed valve; and
  determining the rate of compressor bleed valve closure as a function of said compressor bleed valve position signal and said gas generator speed signal at the instant said enable signal is provided.

* * * * *